(12) United States Patent
Shima et al.

(10) Patent No.: US 8,195,034 B2
(45) Date of Patent: Jun. 5, 2012

(54) LOW COMPLEXITY EVENT DETECTION FOR VIDEO PROGRAMS

(75) Inventors: Masato Shima, Ibaraki (JP); Hiroshi Takaoka, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 562 days.

(21) Appl. No.: 12/422,735

(22) Filed: Apr. 13, 2009

(65) Prior Publication Data
US 2010/0260466 A1 Oct. 14, 2010

(51) Int. Cl.
*H04N 5/93* (2006.01)
(52) U.S. Cl. ........................................ 386/285
(58) Field of Classification Search ............. 386/285
See application file for complete search history.

(56) References Cited

U.S. PATENT DOCUMENTS 6,654,067 B1 * 11/2003 McGee et al. ............... 348/700
7,461,002 B2 * 12/2008 Crockett et al. ............. 704/278

* cited by examiner

*Primary Examiner* — Jason Gee
(74) *Attorney, Agent, or Firm* — Robert D. Marshall, Jr.; Wade James Brady, III; Frederick J. Telecky, Jr.

(57) ABSTRACT

A video processing method for detecting significant events from a video program includes computing short-time sub-band energies in the audio for plural audio sub-bands, detecting scene boundaries where a weighted sum of these short-time sub-band energies are less energy threshold for longer than an time interval, segmenting the video program into a plurality of scenes by the boundaries, removing scenes shorter than a segment time interval and classifying and ranking the remaining scenes by audio. A second segmenting and removal is based upon a second energy threshold and a second time interval or when energy in a lowest frequency sub-band is greater than a predetermined bass energy threshold. The first segment time interval may be recomputed based upon the distribution of length of the remaining scenes.

2 Claims, 6 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

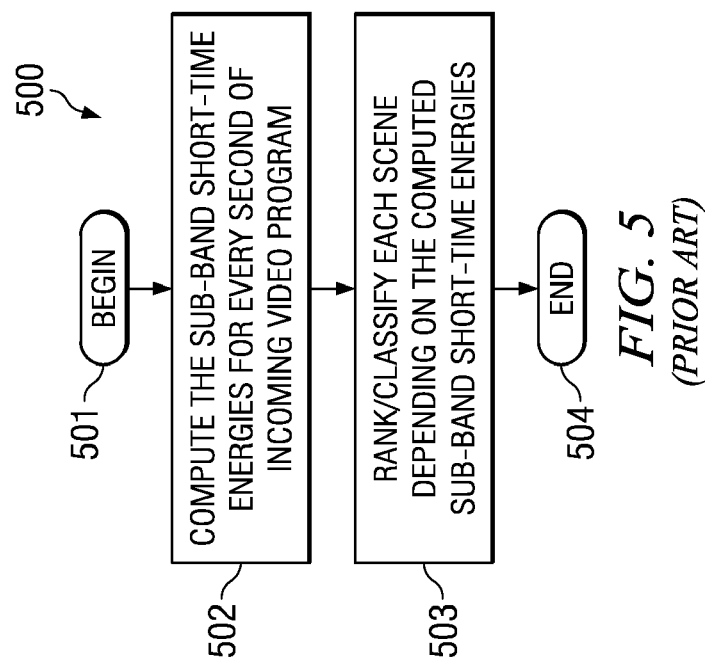

LOW COMPLEXITY EVENT DETECTION FOR VIDEO PROGRAMS

TECHNICAL FIELD OF THE INVENTION

The technical field of this invention is detection of scenes with significant events in multimedia materials.

BACKGROUND OF THE INVENTION

The evolution of video recoding devices over past decades has brought various opportunities to record and store video. Most of the video had been recorded into video cassettes in the past. Then the majority of recording media shifted to optical discs such as CD and DVD. Currently hard disk drives (HDD) are the favorite for multimedia materials storage due to its downward price trend. The price decline of HDD has promoted the evolution of video recording devices capable of recording multiple broadcasted TV materials simultaneously.

Thanks to the evolution of these video recording devices, today's consumers may record and store much more video material than before. This causes the problem of watching time scarcity. The time for today's consumer to playback those recorded materials is limited. Thus there is a strong demand to watch video in a shorter time. There are two approaches to this problem. Many studies have been made in this area. One approach accelerates the playback speed. This is straightforward. The other one approach detects and extracts only the scenes with important events of the video program. Skipping non-important scenes at playback time saves time. The present invention is related to this second approach.

In this technique every scene of video needs to be evaluated correctly. Classification is essential for such an evaluation. Most conventional techniques use various audio and video characteristics of each scene. Video signal processing is believed much more complex than audio signal processing due to the number of samples processed per unit time. The short-time energy of audio signal is the simplest feature among the various characteristics of an audio signal.

The prior art provides audio energy based scene classification. This prior art technique divides the frequency spectrum into several sub-bands and determines the short-time energy of each sub-band. Significant events in sports videos such as scoring opportunities and fine plays tend to be strongly correlated with the instantaneous audio signal energy. Cheers and applause of the audience and excited speech of announcers tend to occur during such events. Extracting the scenes with high audio energy tends to result in the abridgment of the whole video material.

This audio energy based technique tends to over-detect non-significant scenes from pre/post-game short TV program or noisy commercial messages. These portions of the video occasionally contain loud music or artificial sound effects which are rarely found during play in ordinary sports TV program. The prior art provides various audio-based and video-based algorithms to avoid detection of such unwanted scenes. Unfortunately, those algorithms require much more computational resources than the audio energy based technique. These techniques are undesirable for portable devices having limited computational resources and battery energy.

It is therefore desirable to detect scenes with significant events with reasonable accuracy using an audio energy based technique while avoiding unwanted scenes.

SUMMARY OF THE INVENTION

This invention is a method or an apparatus for detecting significant scenes from video with reasonable accuracy while employing low computational resources. The invention includes these steps.

The invention prepares a map that specifies the significance of each scene in video program to be evaluated. Initially all scenes are marked significant.

For every second of video program, the invention computes the sub-band short-time energies of divided frequency bands of the audio signal.

The invention set the following threshold values $T_{EN1}$, $T_{EN2}$, $T_{SI1}$, $T_{SI2}$, $T_{BASS}$, $T_{SEG1}$, and $T_{SEG2}$. These threshold values can be constant, pre-computed or adaptive in subsequent steps.

If the short-time energy of certain sub-band gets below an energy threshold $T_{EN1}$ for longer than a time $T_{SI1}$, the invention considers this time as a silent intermission.

The invention divides the video program into small segments using these silent intermissions as segment boundaries.

The invention re-computes the threshold value $T_{SEG1}$ if necessary based on the length of each segment.

The invention unmarks all scenes located in the segment whose length is shorter than the threshold $T_{SEG1}$.

If the short-time energy falls below an energy threshold $T_{EN2}$ for longer than a time $T_{SI2}$ or the lowest frequency sub-band short-time energy goes above a bass energy threshold $T_{BASS}$ for longer than a certain time, the invention makes this moment a new boundary.

The invention divides each segment into smaller segments using the new boundaries in the previous step.

The invention further unmarks all scenes located in the segment whose length is shorter than the threshold $T_{SEG2}$.

The invention then ranks all the remaining marked scenes of video program by the short-time sub-band energies.

A later process collects highly ranked scenes to create an abridged version of the video program. Alternatively, the invention creates some meta-data to enable more intelligent playback.

The key point of the invention is that it is based upon computation of the sub-band short-time energies. Such calculations require very small computational resources. The present invention is applicable as a standalone application or together with other schemes analyzing video techniques.

BRIEF DESCRIPTION OF THE DRAWINGS

These and other aspects of this invention are illustrated in the drawings, in which:

FIG. 4 illustrates the instruction syntax of the very long instruction word digital signal processor core illustrated in FIG. 2 (prior art);

FIG. 5 illustrates the flow chart of a prior art audio energy video classification technique;

DETAILED DESCRIPTION OF PREFERRED EMBODIMENTS

Figure 1:
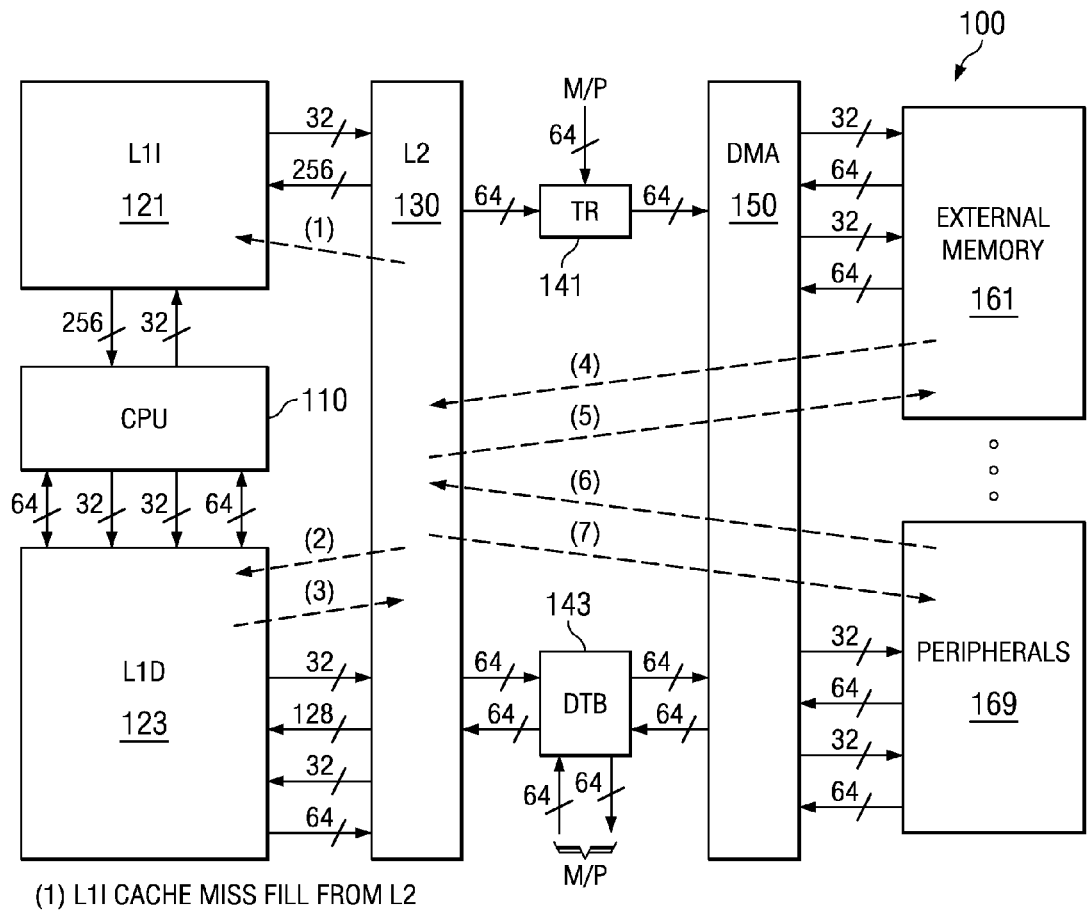
FIG. 1 illustrates the organization of a typical digital signal processor to which this invention is applicable (prior art)

FIG. 1 illustrates the organization of a typical digital signal processor system 100 to which this invention is applicable (prior art). Digital signal processor 100 performs the operation of this invention. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
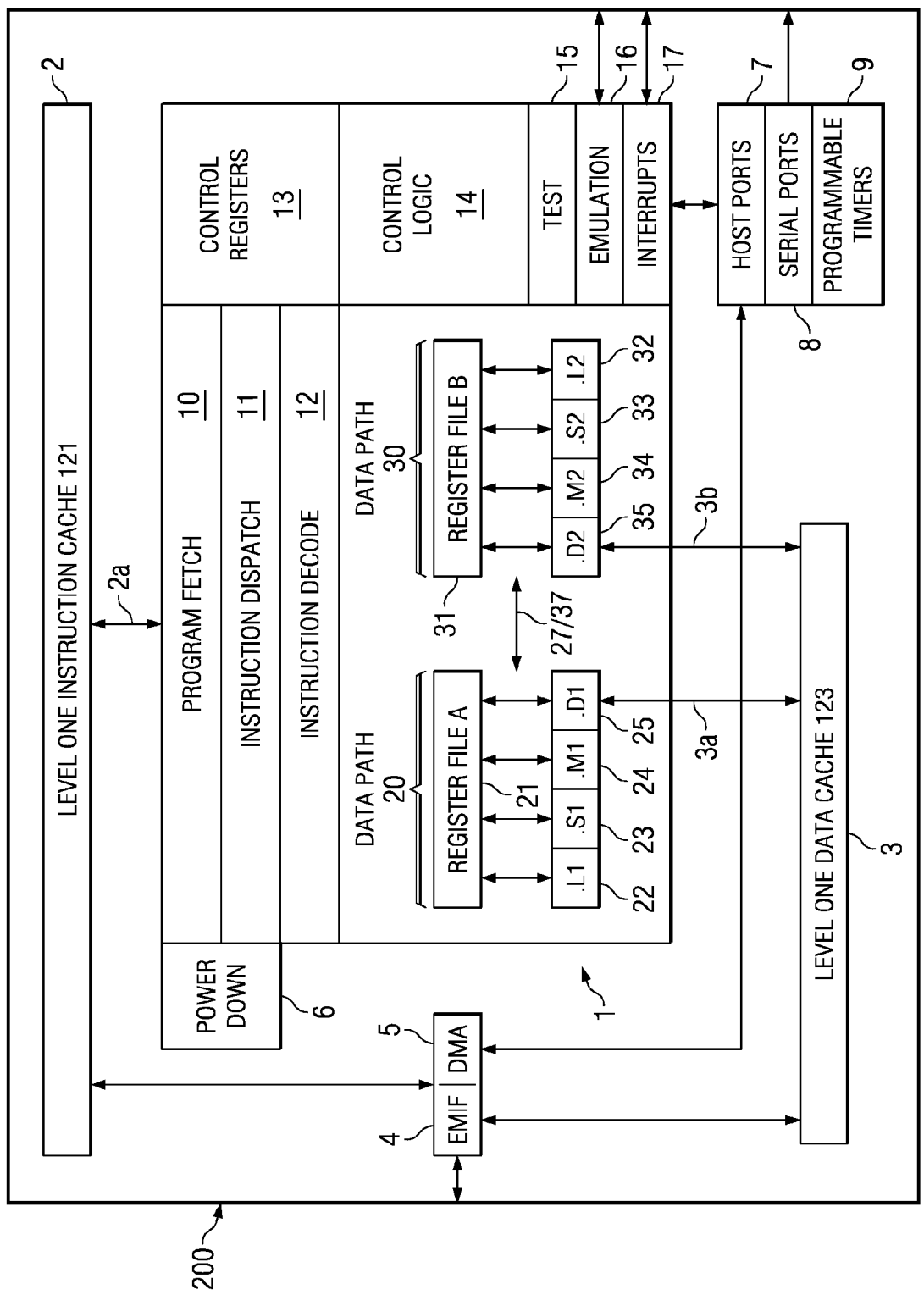
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
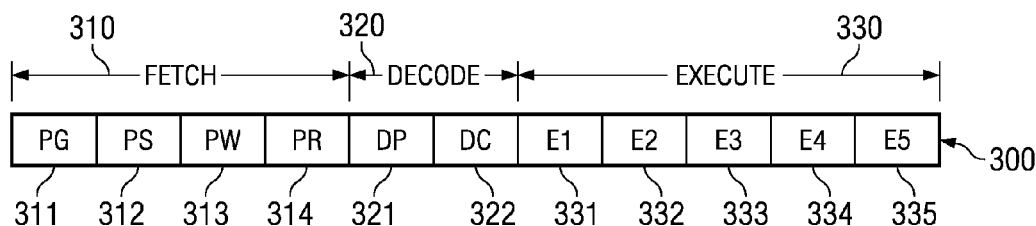
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates a flow chart of a prior art audio energy video classification method 500. Method 500 begins with begin step 501. Step 502 repeatedly computes the respective short-time sub-band energies for repetitive short intervals of the video program. In the prior art an interval of one second has been found to be suitable. The result is a set of sub-band energies for each of a plurality of audio sub-bands for each second of the video. Step 503 ranks and classifies each scene based upon the computed short-time sub-band energies. The prior art typically forms an index from a weighted sum of several audio sub-bands energies for scene classification. This weighted sum is called the significance level. Events are ranked from highest to lowest depending on this significance level. This ranking is applied to each of the short intervals for which the short-time sub-band energy is computed. In accordance with this prior art, significant events in the video are expected to correlate with high energy in plural audio sub-bands. The result of step 503 is a ranked list of these high audio energy locations within the video program. Method 500 ends with end block 504.

Figure 6:
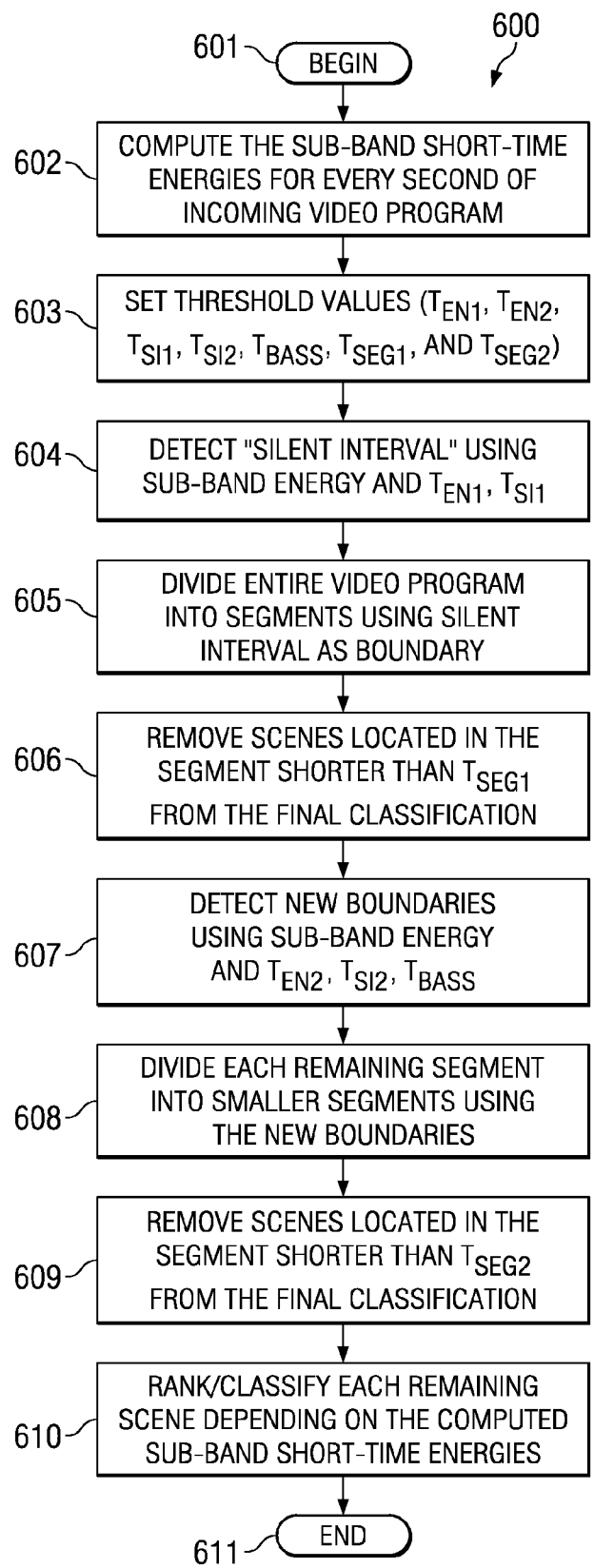
FIG. 6 illustrates the flow chart of the technique of this invention.

FIG. 6 illustrates a flow chart of method 600 of this invention. The invention uses two ideas. The first idea is that transition of scenes such as from broadcasting studio to ballpark and from the main TV program to commercial message tend to contain silent intermissions. Thus any TV program can be segmented using such silent intermissions. The second idea is that the low frequency audio energy of 60 Hz or lower is strongly correlated with the artificial sound effects inserted at the editing level. Such low frequency audio signals tend to be attenuated when a program is recorded by a camera. Thus the existence of artificial sound effects which can be detected by the low frequency audio energy. This enables further classification of materials of a TV program.

Method 600 begins with begin step 601. Step 602 computes the respective short-time sub-band energies for every second of the video. These steps are similar to the prior art steps 501 and 502 described above. Step 603 sets threshold values determining the energy level and the length for silence detection, low frequency sound detection, etc. These threshold values include: $T_{EN1}$ a first energy threshold; $T_{EN2}$ a second energy threshold; $T_{SI1}$ a first segment time interval used in energy determination; $T_{SI2}$ a segment second time interval used in energy determination; $T_{BASS}$ a short-time energy threshold applied to the lowest frequency sub-band; $T_{SEG1}$ a first segment length threshold; and $T_{SEG2}$ a second segment length threshold. These threshold values may be constant or modified according to the audio energy data computed in step 603 in a manner described below.

Step 604 is an initial detection of silent intermissions. Step 604 detects a silent intermission if a weighted sum short-time sub-band energy is below the first energy threshold $T_{EN1}$ for longer than the first time interval $T_{SI1}$. Step 605 segments the video program into pieces employing the detected silent intermissions as boundaries. These detected intermissions generally fall between the main program and a commercial message or between two commercial messages.

Step 606 adjusts some of these video program segments. Step 606 compares the duration of a segment made in step 605 with the first segment time interval $T_{SEG1}$. Video program segments (scenes) shorter that the first segment time interval $T_{SEG1}$ are discarded. This is based on a belief that these smaller segments do not include significant events in the video program. Step 606 may recompute the first segment time interval $T_{SEG1}$ if necessary. Suppose the video program is an entire soccer game without extra periods and both the first and the second largest segments are more than 45 minutes long. The remaining smaller segments would not contain scenes in soccer play in this example. Thus in this example, the first segment time interval $T_{SEG1}$ is reset to discard these remaining smaller segments. This permits detection of significant events from the soccer program. If the first segment time interval $T_{SEG1}$ is recomputed, the step 606 discards scenes according to the recomputed first segment time interval $T_{SEG1}$.

Method 600 next does a second classification. Step 607 detects new boundaries based upon the second energy threshold $T_{EN2}$ and the second time interval $T_{SI2}$, and the short-time bass energy threshold for the lowest frequency sub-band $T_{BASS}$. Step 607 operates like step 604 detecting a scene boundary silent intermission if a weighted sum of short-time sub-band energy is below the second energy threshold $T_{EN2}$ for longer than the second time interval $T_{SI2}$. Another boundary determination is made comparing the energy in the lowest sub-band with $T_{BASS}$. Many video programs start with opening credits containing fancy sound and visual effects. These portions of the video program tend to have larger energy in lowest frequency sub-band than other scenes because such sound effects inserted at the editing level. These sound effects do not come from the actual environment. Step 608 inserts scene boundaries at times when the energy in the lowest frequency sub-band is above the base threshold $T_{BASS}$. Thus step 608 divides the segmented video into smaller pieces using the low frequency audio energy data and the additional silence intermissions. Step 609 compares the scene lengths to the second segment length $T_{SEG2}$ and discards segments smaller than $T_{SEG2}$.

Step 610 classifies and ranks each remaining scene according to short-time sub-band energy. This step is the same as prior art step 503 illustrated in FIG. 5. In accordance with the prior art, locations within the video program having high weighted sum short-time sub-band audio energy are expected to correspond to significant events. Method 600 ends with end block 611. The result of this detection and classification is a list of locations within the video program expected to correspond to significant events. This list may be used to reduce viewing time by viewing only those significant event locations.

This invention separates scenes in the video program into main contents and minor scenes. These minor scenes are expected to include commercial messages, opening/ending credits and the like. Searching only main contents for significant event leads improved accuracy in significant event detection. Table 2 lists statistical evidence supporting the effectiveness of this invention.

TABLE 2

| Prior Art | | | Invention | | |
|---|---|---|---|---|---|
| Level | Time | Detect | Level | Time | Detect |
| 2% | 2:44 | 0/8 | 2% | 2:49 | 7/8 |
| 4% | 5:51 | 5/8 | 4% | 5:38 | 8/8 |
| 8% | 10:55 | 7/8 | 8% | 11:09 | 8/8 |
| 16% | 22:31 | 8/8 | 16% | 22:50 | 8/8 |
| Full | 150:07 | 8/8 | Full | 97:58 | 8/8 |

Figure 7:
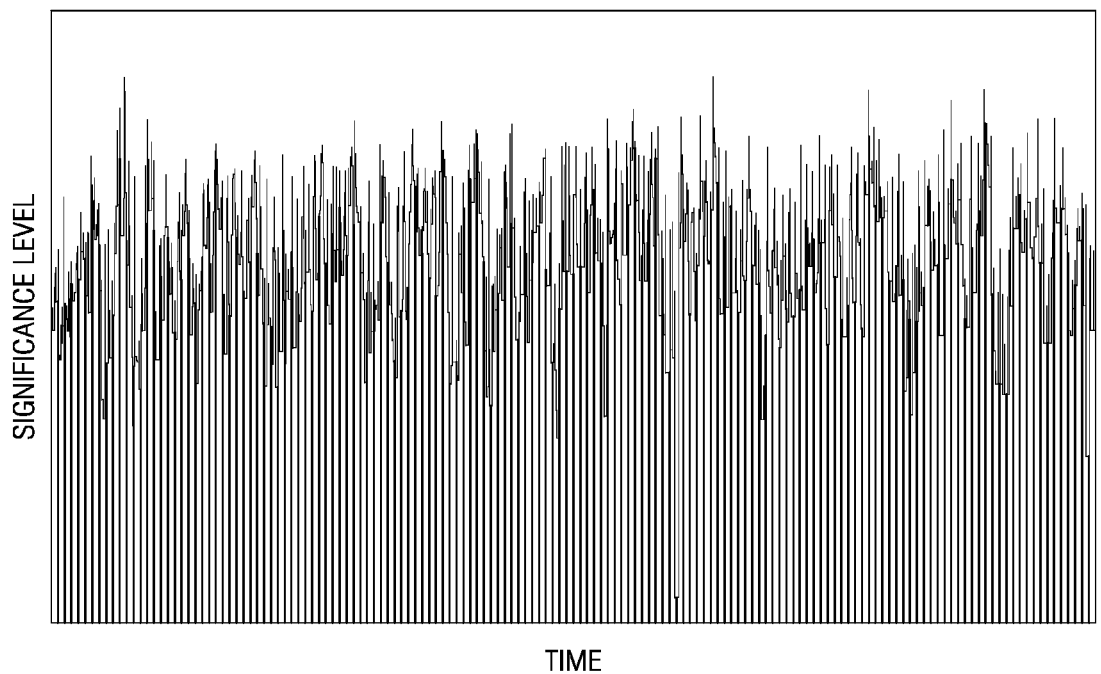
FIG. 7 illustrates the significance level of a typical sport program computed by a prior art audio energy video classification technique.
Figure 8:
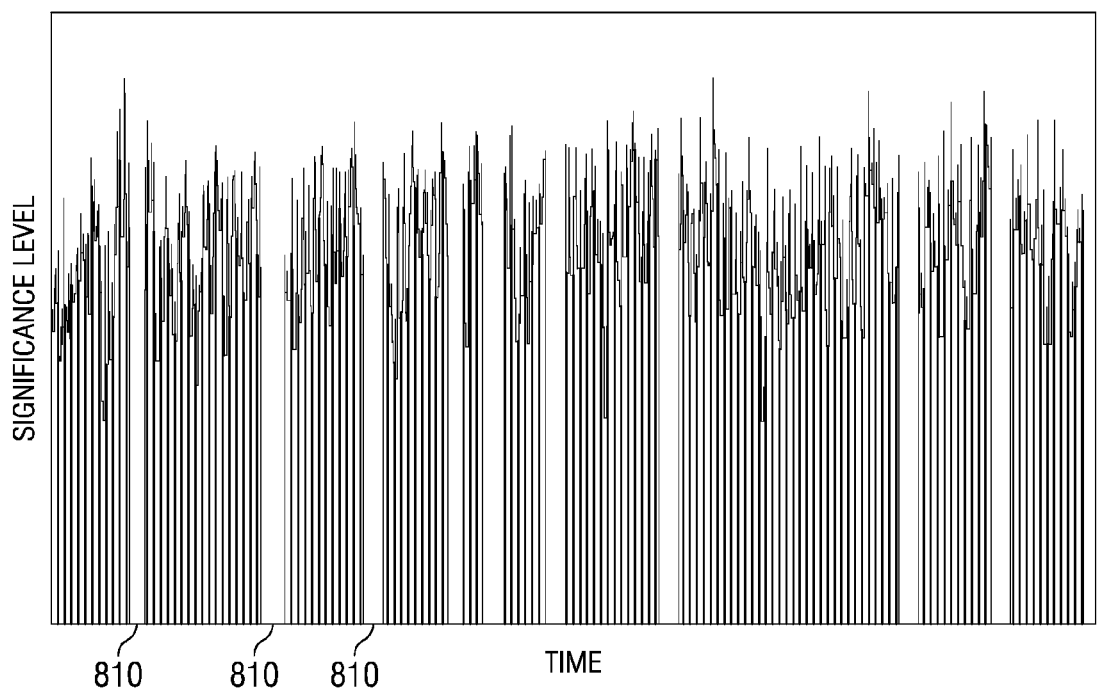
FIG. 8 illustrates the significance level of a typical sport program computed using this invention.
Figure 9:
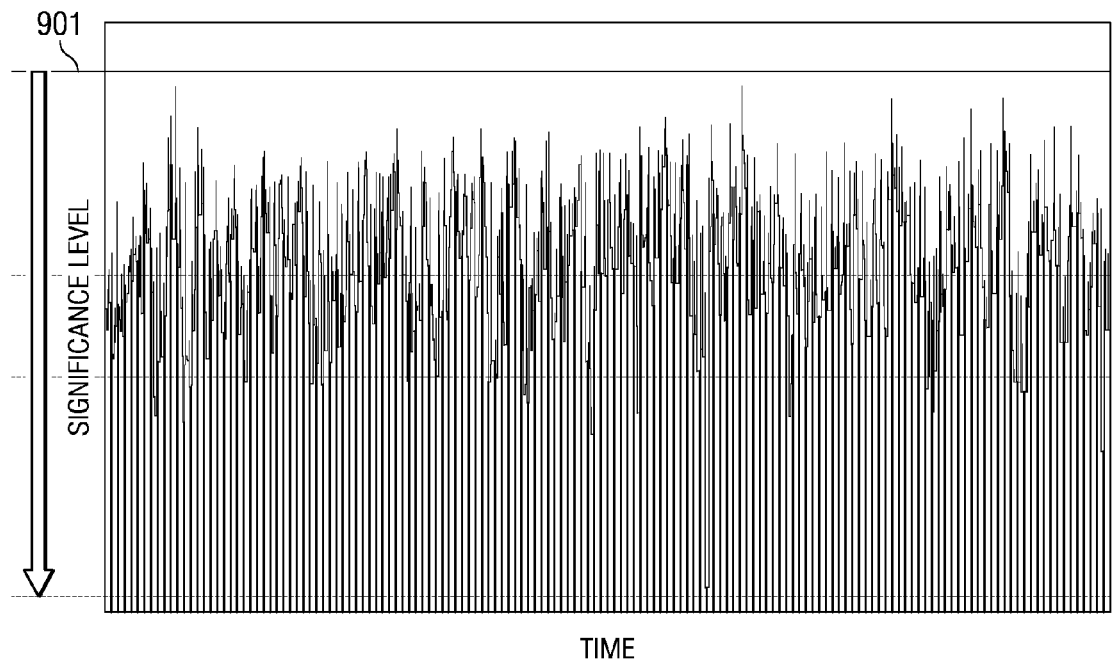
FIG. 9 illustrates the prior art method of determining the scenes to be extracted utilizing the significance level illustrated in FIG. 7.
Figure 10:
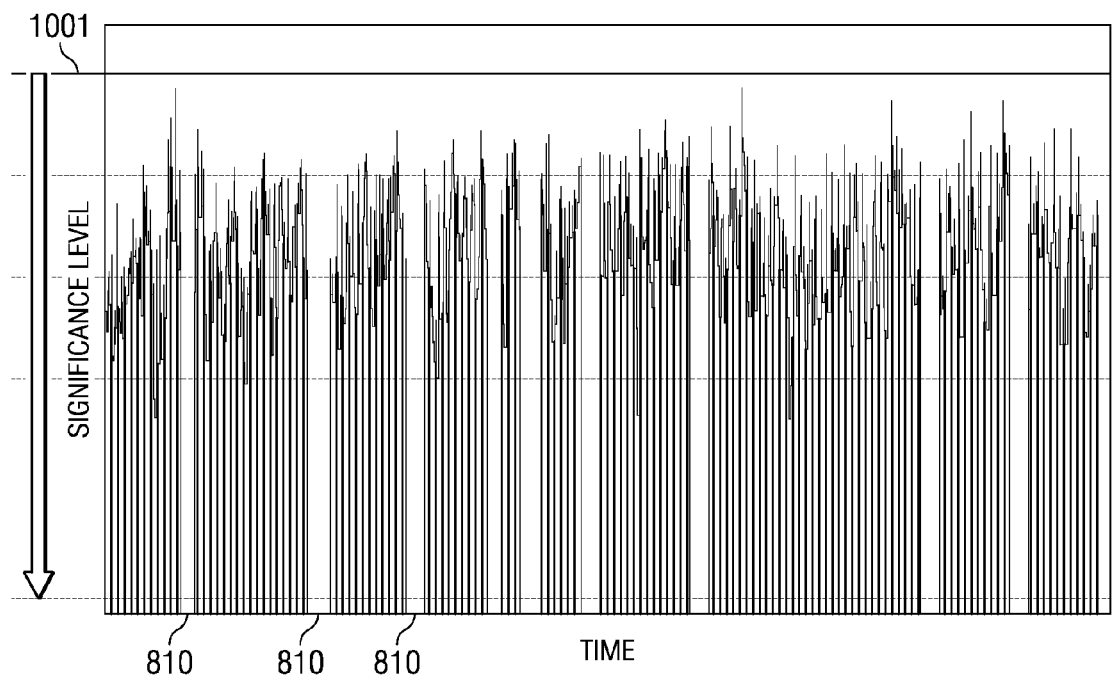
FIG. 10 illustrates the method of determining the scenes to be extracted utilizing the significance level illustrated in FIG. 8 using this invention.

The example of Table 2 is one entire soccer game TV program from the UEFA Champions League 2007 of Besiktas at Liverpool on Nov. 7, 2007. Eight total goals were scored with a final score of 0-8. The video program length was 150 minutes and 7 seconds. Table 2 lists the results for the prior art method (FIG. 5) and the method of this invention (FIG. 6). FIG. 7 illustrates the significance level of a typical sports program computed by the prior art method of FIG. 5. FIG. 8 illustrates the significance level of that same sports program computed by this invention of FIG. 6. Note gaps 810 corresponding to portions of the video program discarded in steps 606 and 609 of the prior art. FIG. 9 illustrates the typical extraction process of step 503. FIG. 9 illustrates a varying threshold significance level 901. The significance value of each short time interval is compared with a current threshold level 901. Scenes with significance level higher than the current threshold value will be extracted and ranked accordingly. It is typical to provide some time margin before and after the scenes. The typical prior art implementation then will compute the optimal threshold value to obtain the targeted extraction length. FIG. 10 illustrates a similar process using varying threshold level 1001 with regard to the significance level of FIG. 8. Using the respective methods 2%, 4%, 8% and 16% of the temporal length of the program were extracted. The Level column lists these extraction levels and the Full length of the video program. The Time column indicates the total extracted program segment length for the various extraction levels. The last row marked Full lists the length of the video material actually processed according to step 503 for the prior art and step 610 for the invention. For the prior art the entire video program length of 150 minutes and 7 seconds was processed. For the invention, only 97 minutes and 58 seconds were processed because other parts of the video program were discarded in steps 606 and 609. The Detect column indicates the number of goals within the extracted portion relative to the total of 8 goals.

Table 2 shows improvement in the significant scene detection performance. At 2% extraction the invention detected 7 of 8 possible goals. The prior art method did not detect any of the goal in the equivalent extraction length times of 2 minutes 44 seconds versus 2 minutes 49 seconds. This failure is mainly because the prior art method extracted many out of play scenes such as commercial messages, opening/ending credits and the like having large audio short-time energies. For the 4% extraction case, the invention detected all 8 goals while the prior art method detected only 5 of 8 goals. The prior art technique finally detected all the goals at 16% extraction. Thus the pre-classification of the video program by the invention improves the significant scene/event detection performance relative to the prior art method. The extra steps 604 to 609 of this invention will not greatly increase the computational requirement relative to the prior art.

What is claimed is:

1. A video processing method for detecting significant events from a video program comprising the steps of:

computing short-time sub-band energies in an audio of the video program for plural audio sub-bands;

detecting scene boundaries from the audio of the video program by detecting whether the short-time sub-band energies are less than a predetermined first energy threshold for longer than a predetermined first energy time interval;

segmenting the video program into a plurality of scenes using the detected scene boundaries as boundaries;

removing scenes from the video program having a length shorter than a first segment time interval;

following said step of removing scenes detecting second scene boundaries in the audio of the video program by detecting
whether the short-time sub-band energies are less than a predetermined second energy threshold for longer than a predetermined second energy time interval, and
whether the short-time sub-band energy in a lowest frequency sub-band is greater than a predetermined bass energy threshold;

further segmenting the video program into a plurality of scenes using the detected second scene boundaries as boundaries;

further removing scenes from the video program having a length shorter than a predetermined second segment time interval; and classifying and ranking remaining scenes based upon short-time sub-band energy in the audio from largest to smallest.

2. The method of claim 1, further comprising:
following said step of removing scenes:
recomputing the first segment time interval based upon a distribution of length of the remaining scenes; and
further removing scenes from the video program having a length shorter than the recomputed first segment time interval.

* * * * *